United States Patent
Prasad et al.

(10) Patent No.: US 9,733,973 B2
(45) Date of Patent: Aug. 15, 2017

(54) AUTOMATICALLY DETERMINING SENSOR LOCATION IN A VIRTUALIZED COMPUTING ENVIRONMENT

(71) Applicant: Cisco Technology, Inc., San Jose, CA (US)

(72) Inventors: Rohit C. Prasad, Sunnyvale, CA (US); Shashidhar R. Gandham, Fremont, CA (US); Navindra Yadav, Cupertino, CA (US); Khawar Deen, Sunnyvale, CA (US); Shih-Chun Chang, San Jose, CA (US); Ashutosh Kulshreshtha, San Jose, CA (US); Anubhav Gupta, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 14/855,811

(22) Filed: Sep. 16, 2015

(65) Prior Publication Data

US 2017/0075710 A1    Mar. 16, 2017

(51) Int. Cl.
*G06F 9/455* (2006.01)
*H04L 12/26* (2006.01)

(52) U.S. Cl.
CPC .......... *G06F 9/45558* (2013.01); *H04L 43/12* (2013.01); *G06F 2009/4557* (2013.01); *G06F 2009/45591* (2013.01); *G06F 2009/45595* (2013.01)

(58) Field of Classification Search
None
See application file for complete search history.

(56) References Cited

U.S. PATENT DOCUMENTS

| | | | |
|---|---|---|---|
| 6,772,099 B2 | 8/2004 | Merkin et al. | |
| 7,277,414 B2 * | 10/2007 | Younis | G01D 9/005 370/311 |
| 7,917,333 B2 | 3/2011 | Grichnik et al. | |
| 7,937,167 B1 * | 5/2011 | Mesarina | H04W 8/186 340/870.11 |
| 8,462,697 B2 | 6/2013 | Park et al. | |

(Continued)

OTHER PUBLICATIONS

Nene et al, UREA: Uncovered Region Exploration Algorithm for Reorganization of Mobile Sensor Nodes to Maximize Coverage, 2010, IEEE, pp. 1-6.*

*Primary Examiner* — Abu Ghaffari
(74) *Attorney, Agent, or Firm* — Edell, Shapiro & Finnan, LLC

(57) ABSTRACT

A virtualized computing system including software sensors captures network data from one or more traffic flows the sensors. The captured network data from a given sensor indicates one or more traffic flows detected by the given sensor. The received captured network data is analyzed to identify, for each respective sensor, a first group of sensors, a second group of sensors, and a third group of sensors. All traffic flows observed by the first group of sensors are also observed by the second group of sensors. All traffic flows observed by the second group of sensors are also observed by the third group of sensors. A location of each respective sensor relative to other sensors within the virtualized computing system is determined based upon whether the respective sensor belongs to the first group of sensors, the second group of sensors, or the third group of sensors.

17 Claims, 9 Drawing Sheets

(56) References Cited

U.S. PATENT DOCUMENTS

| | | |
|---|---|---|
| 8,572,155 B2 | 10/2013 | Yanovich et al. |
| 8,830,230 B2 | 9/2014 | Bai et al. |
| 9,438,634 B1* | 9/2016 | Ross .................. H04L 63/20 |
| 2006/0095223 A1* | 5/2006 | Gordon ................ G01N 29/07 |
| | | 702/116 |
| 2009/0055691 A1* | 2/2009 | Ouksel ................ G01D 21/00 |
| | | 714/48 |
| 2010/0242045 A1* | 9/2010 | Swamy ................ G06F 9/455 |
| | | 718/104 |
| 2012/0233608 A1* | 9/2012 | Toeroe ............... G06F 9/45558 |
| | | 718/1 |
| 2012/0254993 A1* | 10/2012 | Sallam ................ G06F 21/53 |
| | | 726/22 |
| 2012/0304172 A1* | 11/2012 | Greifeneder ........ G06F 9/45504 |
| | | 718/1 |
| 2012/0331135 A1* | 12/2012 | Alon .................. H04L 41/044 |
| | | 709/224 |
| 2013/0083806 A1* | 4/2013 | Suarez Fuentes .. H04L 41/0893 |
| | | 370/465 |
| 2013/0090904 A1* | 4/2013 | Gupta ................. G08G 1/0108 |
| | | 703/6 |
| 2014/0013339 A1 | 1/2014 | Lee et al. |
| 2014/0068069 A1* | 3/2014 | Bansal ................ H04L 43/022 |
| | | 709/224 |
| 2014/0080528 A1 | 3/2014 | Lim et al. |
| 2014/0149060 A1* | 5/2014 | Meduna .............. G06F 1/3206 |
| | | 702/94 |
| 2014/0330827 A1* | 11/2014 | Wu .................. G06F 17/30598 |
| | | 707/737 |
| 2014/0359552 A1* | 12/2014 | Misra ................. H04L 67/12 |
| | | 717/100 |
| 2014/0372348 A1* | 12/2014 | Lehmann ............ G06K 9/6265 |
| | | 706/12 |

\* cited by examiner

| FLOW | SENSOR EMBEDDED IN VIRTUAL MACHINE (SENSOR $S_{VM}$) | SENSOR EMBEDDED IN HYPERVISOR (SENSOR $S_H$) | SENSOR EMBEDDED IN NETWORK ELEMENT (SENSOR $S_N$) |
|---|---|---|---|
| F1 (STARTS AT $S_{VM}$) | F1 | F1 | F1 |
| F2 (STARTS AT $S_H$) | - | F2 | F2 |
| F3 (STARTS AT $S_N$) | - | - | F3 |

FIG.3A

| | TUPLES | FRONT SENSORS (INTERSECTION OF SECOND ELEMENTS) | UNION OF SECOND ELEMENTS | REAR SENSORS (UNION-INTERSECTION OF SECOND ELEMENTS) |
|---|---|---|---|---|
| SENSOR $S_{VM}$ | $\{S_{VM}, \{S_H, S_N\}\}$ | $(S_H, S_N)$ | $(S_H, S_N)$ | $\{\}$ |
| SENSOR $S_H$ | $\{S_H, \{S_{VM}, S_N\}\}$ $\{S_H, \{S_N\}\}$ | $(S_N)$ | $(S_{VM}, S_N)$ | $S_{VM}$ |
| SENSOR $S_N$ | $\{S_N, \{S_{VM}, S_H\}\}$ $\{S_N, \{S_H\}\}$ $\{S_N, \{\}\}$ | $\{\}$ | $(S_{VM}, S_H)$ | $(S_{VM}, S_H)$ |

FIG.3B

| FLOW | SENSOR EMBEDDED IN FIRST LEVEL (SENSOR $S_1$) | SENSOR EMBEDDED IN SECOND LEVEL (SENSOR $S_2$) | SENSOR EMBEDDED IN THIRD LEVEL (SENSOR $S_3$) | SENSOR EMBEDDED IN FOURTH LEVEL (SENSOR $S_4$) |
|---|---|---|---|---|
| F1 (STARTS AT $S_1$) | F1 | F1 | F1 | F1 |
| F2 (STARTS AT $S_2$) | - | F2 | F2 | F2 |
| F3 (STARTS AT $S_3$) | - | - | F3 | F3 |
| F4 (STARTS AT $S_4$) | - | - | - | F4 |

FIG.4A

| TUPLES | FRONT SENSORS (INTERSECTION OF SECOND ELEMENTS) | UNION OF SECOND ELEMENTS | REAR SENSORS (UNION-INTERSECTION OF SECOND ELEMENTS) |
|---|---|---|---|
| SENSOR $S_1$ | {$S_1$, {$S_2$, $S_3$, $S_4$}} | {$S_2$, $S_3$, $S_4$} | {$S_2$, $S_3$, $S_4$} | ( ) |
| SENSOR $S_2$ | {$S_2$, {$S_1$, $S_3$, $S_4$}} {$S_2$, {$S_3$, $S_4$}} | {$S_3$, $S_4$} | {$S_1$, $S_3$, $S_4$} | {$S_1$} |
| SENSOR $S_3$ | {$S_3$, {$S_1$, $S_2$, $S_4$}} {$S_3$, {$S_2$, $S_4$}} {$S_3$, {$S_4$}} | {$S_4$} | {$S_1$, $S_2$, $S_4$} | {$S_1$, $S_2$} |
| SENSOR $S_4$ | {$S_4$, {$S_1$, $S_2$, $S_3$}} {$S_4$, {$S_2$, $S_3$}} {$S_4$, {$S_3$}} {$S_4$, { }} | ( ) | {$S_1$, $S_2$, $S_3$} | {$S_1$, $S_2$, $S_N$} |

FIG.4B

AUTOMATICALLY DETERMINING SENSOR LOCATION IN A VIRTUALIZED COMPUTING ENVIRONMENT

TECHNICAL FIELD

The present disclosure relates to determining the location of sensors in a network, and in particular, to determining the location of sensors relative to other sensors as well as the environment in which the sensors are located, without additional configuration of the system.

BACKGROUND

A software sensor can be deployed on a virtual machine, on a hypervisor managing a plurality of virtual machines, or within a physical switch (e.g., a switching Application Specific Integrated Circuit (ASIC) or a router).

The sensor reads a configuration file, e.g., a file manually created and updated by an administrator, in order to determine the location at which the sensor has been deployed, e.g., whether the sensor is located on a virtual machine, a hypervisor, or a physical switch, and also, to determine the hypervisor (or physical machine's name and Internet Protocol (IP) address) in case the sensor is located inside a virtual machine. However, use of a configuration file to determine the location of a sensor requires updating the configuration file each time that a new sensor is deployed or when an existing sensor migrates to a new location. Alternatively, the hypervisor environment may be queried using hypervisor-specific Application Programming Interfaces (APIs) and management interfaces provided by various hypervisor environments, e.g., Xen®, Vmware®, KVM®, etc., to determine sensor placement (in terms of its relative placement, and to determine the hypervisor's IP address if the sensor is contained inside a virtual machine). However, both of these approaches are manually driven and time-consuming processes. In addition, these processes are also error prone, especially when a virtual machine containing a sensor is moved to a different machine (or different hypervisor).

BRIEF DESCRIPTION OF THE DRAWINGS

FIG. 3A is a table showing traffic flows reported by sensors, according to an example embodiment.

FIG. 3B is a table illustrating computations for determining a location of a respective sensor, relative to other sensors, according to an example embodiment.

FIG. 4A is another example of a table showing traffic flows reported by sensors, according to an example embodiment.

FIG. 4B is another example of a table illustrating computations for determining a location of a respective sensor, relative to other sensors, according to an example embodiment.

DESCRIPTION OF EXAMPLE EMBODIMENTS

Overview

Figure 1:
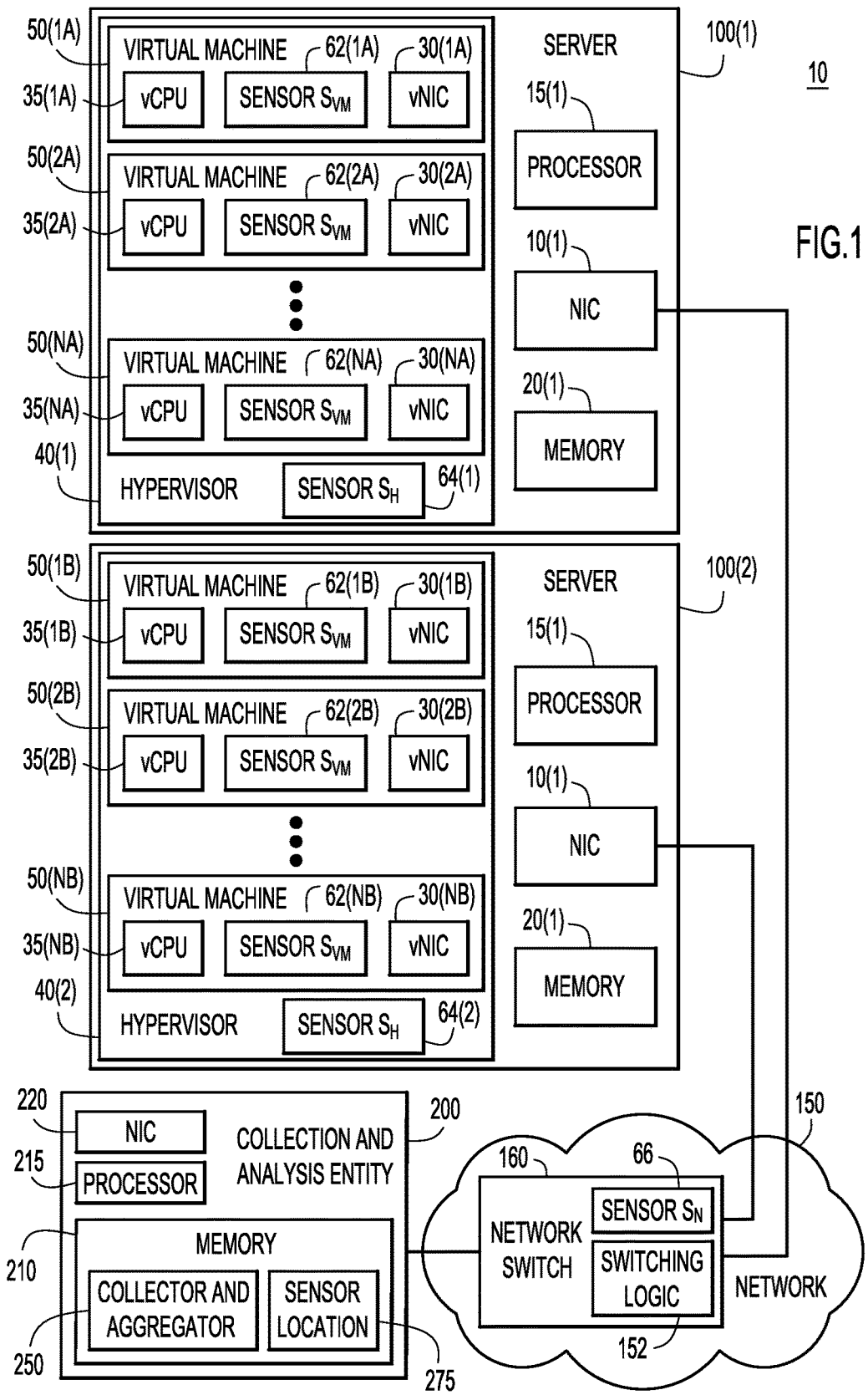
FIG. 1 is a diagram of a virtualized network system in which sensors are deployed, according to an example embodiment.

Techniques are provided for determining location of a sensor relative to other sensors in a virtualized computing system. In a virtualized computing system in which a plurality of software sensors are deployed and in which there are one or more traffic flows, captured network data is received from the plurality of sensors, the captured network data from a given sensor of the plurality of sensors indicating one or more traffic flows detected by the given sensor. The received captured network data is analyzed to identify, for each respective sensor, a first group of sensors, a second group of sensors, and a third group of sensors, wherein all traffic flows observed by the first group of sensors are also observed by the second group of sensors, and all traffic flows observed by the second group of sensors are also observed by the third group of sensors. For each respective sensor, a location of the sensor relative to other sensors within the virtualized computing system is determined based upon whether the sensor belongs to the first group of sensors, the second group of sensors, or the third group of sensors. The environment in which the sensor is located, e.g., whether the sensor is on a virtual machine, a hypervisor, or networking switch, may also be determined.

Example Embodiments

Presented herein are techniques for automatically determining the location of sensors deployed in a large scale virtualized computing environment, based upon information collected from packets and/or traffic flows (including control flows), observed by the sensors. The packets of traffic that are observed for purposes of the techniques presented herein do not need to be of any special form or type.

Virtualization enables improved efficiency with regard to utilization of computing resources. For example, computing resources of a physical server may be distributed among a plurality of virtual machines with the same or different operating systems. Virtual machines may be instantiated, migrated, or removed in response to changing computing demands.

In a datacenter or other large computing deployment, there may be millions of live sensors distributed throughout the network, reporting information associated with traffic flows/packets, e.g., as part of control flows, to a collection and analysis entity. The collection and analysis entity may perform a number of processing activities on the received data ranging from network diagnostics to security-related operations. In general, such applications need to know where the sensor is located, e.g., whether the sensor is deployed on a virtual machine, a hypervisor, or in physical networking equipment (e.g., a switch), in order perform desired operations.

Accordingly, a sensor may be deployed on each virtual machine, each hypervisor, and each switch. Each deployed sensor can collect and send information pertaining to the packets or flows passing through the respective sensor to another computing device, such as the collection and aggregation entity, as part of a control flow. By collectively analyzing data reported by each of these sensors, the collection and aggregation entity may determine a location of a sensor relative to the location of other sensors. In addition, the environment in which the sensor is located, with regard to whether it has been deployed on a virtual machine, a hypervisor, or a switch, may also be determined.

The techniques presented herein provide for a way to determine the location of sensors in a virtualized computing environment from analyzing packets and/or traffic without additional configuration of the system in which the sensor is deployed. For example, when a virtual machine that includes a sensor migrates from a first location (host) under the control of a first hypervisor to a second location (host) under the control of a second hypervisor, the new location of the sensor may be automatically determined without additional configuration of the system, e.g., without updating an external configuration file.

FIG. 1 shows a diagram of an example virtualized network system 10 comprising servers 100(1) and 100(2), a network 150 that includes at least one network switch 160, and a collection and analysis entity 200. This example is not intended to be limiting with regard to the specific examples provided herein, as the techniques presented may be applied to any number of servers, and any number of networking switches. Although the collection and analysis entity 200 is shown as operating on a stand-alone server, the collection and analysis entity may be integrated with one of the servers.

Each server 100(1) and 200(2) may comprise a network interface card (NIC), a processor, and a memory. Specifically, server 100(1) includes a network interface card 10(1), a processor 15(1) and memory 20(1), and server 100(2) includes a network interface card 10(2), a processor 15(2) and memory 20(2). The memory and processing resources of a server may be partitioned among a plurality of virtual machines. In general, resources are allocated to a virtual machine, including memory, processing resources, etc., from the physical server on which it is instantiated by a virtual machine manager or hypervisor. The hypervisor may communicate with the Host Operating System (OS) residing on the server in order to partition available computing resources among a plurality of virtual machines. In other aspects, the hypervisor may communicate directly with the physical hardware layer itself.

One or more servers may each host a plurality of virtual machines, and a hypervisor may be used to manage the plurality of virtual machines. For example, server 100(1) may host a plurality of virtual machines 50(1A)-50(NA) that are managed by hypervisor 40(1). Similarly, server 100(2) may host a plurality of virtual machines 50(1B)-50(NB) that are managed by hypervisor 40(2). Each virtual machine may comprise a virtual switch/virtual network interface element (vNIC), and a virtual processor (vCPU). A vNIC logically connects a virtual machine to a virtual interface, allowing the virtual machine to send and receive traffic through the virtual interface. A vCPU is a CPU core assigned to the operating system of the virtual machine. Specifically, virtual machine 50(1A) includes a vNIC 30(1A) and a vCPU 35(1A), virtual machine 50(2A) includes a vNIC 30(2A) and a vCPU 35(2A), and virtual machine 50(NA) includes a vNIC 30(NA) and a vCPU 35(NA). Similarly, with respect to server 100(2), virtual machine 50(1B) includes a vNIC 30(1B) and a vCPU 35(1B), virtual machine 50(2B) includes a vNIC 30(2B) and a vCPU 35(2B), and virtual machine 50(NB) includes a vNIC 30(NB) and a vCPU 35(NB).

In this example, software sensors are present in the virtualization hierarchy at the level of a virtual machine, a hypervisor, and at a networking switch. For example, sensors $S_{VM}$ 62(1A)-62(NA) and 62(1B)-62(NB) are deployed at the virtual machine level (hence the designation $_{VM}$), sensors $S_H$ 64(1) and 64(2) are deployed at the hypervisor level (hence the designation $_H$), and sensor $S_N$ 66 is deployed at the networking switch level (hence the designation $_N$). In particular, with respect to server 100(1), sensor $S_{VM}$ 62(1A) is deployed on virtual machine 50(1A), sensor $S_{VM}$ 62(2A) is deployed on virtual machine 50(2A), and sensor $S_{VM}$ 62(NA) is deployed on virtual machine 50(NA). Similarly, sensor $S_H$ 64(1) is deployed on hypervisor 40(1). With respect to server 100(2), sensor $S_{VM}$ 62(1B) is deployed on virtual machine 50(1B), sensor $S_{VM}$ 62(2B) is deployed on virtual machine 50(2B), and sensor $S_{VM}$ 62(NB) is deployed on virtual machine 50(NB). Likewise, sensor $S_H$ 64(2) is deployed on hypervisor 40(2).

Traffic may flow between virtual machines on the same server, e.g., from vNIC 30(1A) of virtual machine 50(1A) through hypervisor 40(1) to vNIC 30(2A) of virtual machine 50(2A). In other examples, traffic may flow between virtual machines on different servers, e.g., from vNIC 30(1A) of virtual machine 50(1A), through hypervisor 40(1) and NIC 10(1) to network switch 160. Once at network switch 160, the traffic may be directed through NIC 10(2) and hypervisor 40(2) to reach vNIC 30(1B) on destination virtual machine 50(1B).

Network 150 may include any number of any combinations of communications devices including switches, routers, etc. With respect to FIG. 1, one or more network switches 160 may be deployed within network 150, with the network switch 160 transmitting traffic between physical servers 100(1), 100(2) and the collection and analysis entity 200.

Network switch 160 comprises switching logic 152 for directing traffic flow, and sensor $S_N$ 66. Switching logic 152 examines header information of packets and forwards packets to a destination device based upon Media Access Control (MAC) or IP addresses. Although FIG. 1 shows one network switch 160, any number of network switches may be present in network 150.

Collection and analysis entity 200 is also shown in FIG. 1. In general, collection and analysis entity 200 may correspond to a single process or a cluster of processes for collecting and analyzing information reported by sensors. Collection and analysis entity 200 may include a memory 210, a processor 215, and a Network Interface Card (NIC) 220. The memory 210 stores executable software instructions for collector and aggregator module 250 that receives and aggregates data transmitted as part of control flows by the plurality of deployed sensors. This information may be analyzed by software instructions of a sensor location module 275 that determines a location of each sensor relative to other sensors in the virtualized system as well as in a particular environment, e.g., on a virtual machine, hypervisor, or switch. Collection and analysis entity 200 may be a stand-alone server or reside/run on one of the servers 100(1) or 100(2).

A sensor may capture data or metadata associated with packets and/or traffic flows through the sensor. Accordingly, a sensor may report the captured data or metadata about the packets/traffic flows that it observes (or a subset thereof) to collection and analysis entity 200 via a control flow. Apart from captured network data or metadata, a sensor may also capture additional information about the system that it resides on, including but not limited to, data or metadata of active or previously active system processes, metadata of files that are present on the system, and so forth.

In general, a "sensor" as used herein refers to a software sensor, e.g., one or more processes or one or more agents, running on a system to capture network data and deployed within a networking or computing environment, e.g., a data center, a cloud-based computing environment, or other large scale computing environment in which virtualization is deployed. A sensor may also be referred to as a packet inspection agent.

Figure 2:
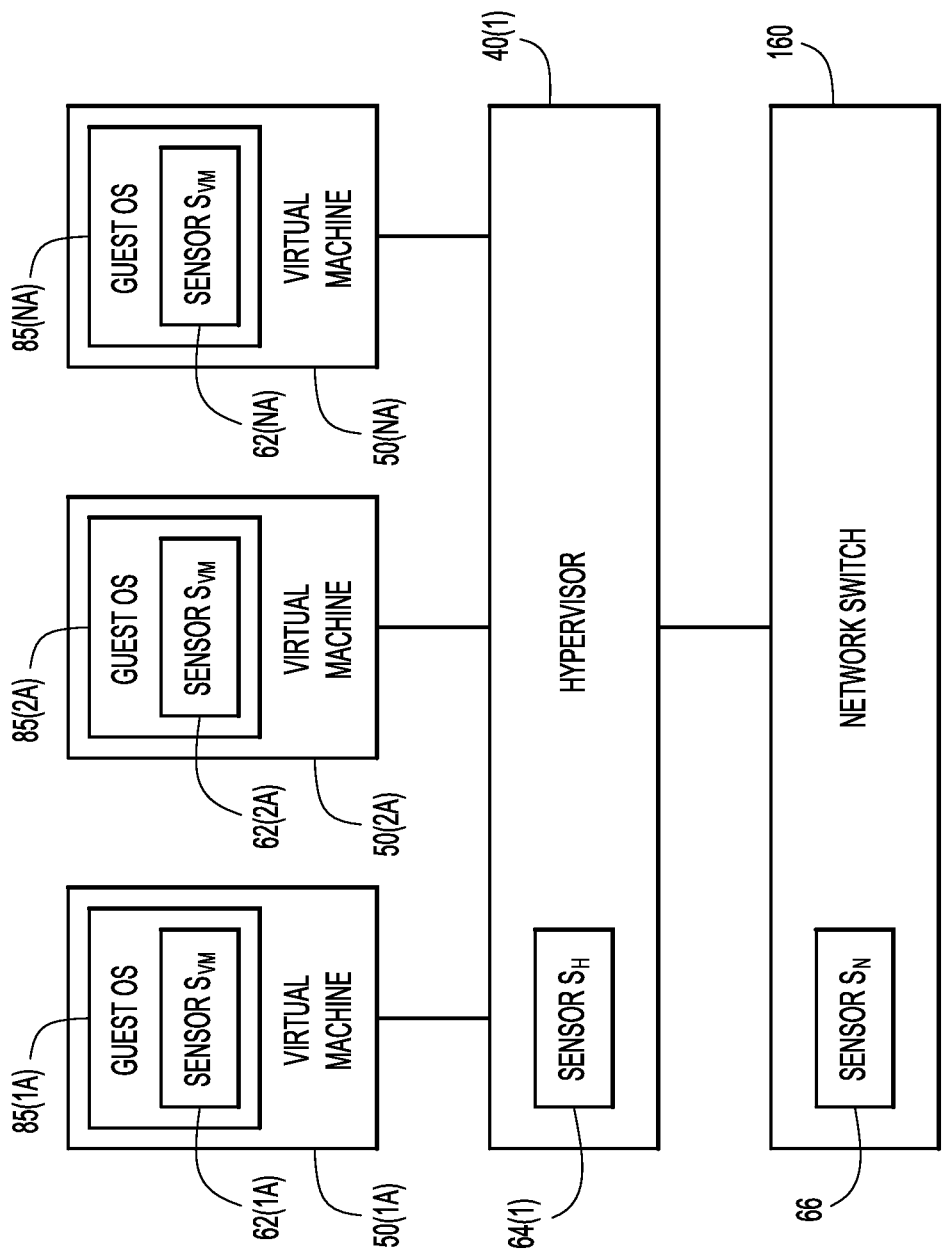
FIG. 2 is another diagram of the virtualized network system, showing a hierarchy of deployed sensors, according to an example embodiment.

FIG. 2 is another diagram, similar to FIG. 1 but simplified, and showing a hierarchy of deployed sensors in a virtualized computing environment. Sensors may be present and running in multiple environments, including at the virtual machine level, at the hypervisor level, and at the physical switch level. In this example, sensor $S_{VM}$ 62(1A) may run as a process, a kernel module, or a kernel driver on a guest Operating System (OS) 85(1A) installed on a virtual machine 50(1A). Sensor $S_v$ 62(2A) may run as a process, a kernel module, or a kernel driver on a guest Operating System (OS) 85(2A) installed on a virtual machine 50(2A). Sensor $S_v$ 62(NA) may run as a process, a kernel module, or a kernel driver on a guest Operating System (OS) 85(NA) installed on a virtual machine 50(NA). Sensor $S_H$ 64(1), installed at hypervisor 40(1), may run as a process, a kernel module, or a kernel driver on the host OS. Sensor $S_N$ 66 may run as a process or a component in network switch 160 capable of performing routing or switching operations.

In some aspects, network switch 160 may provide for installation of sensors, e.g., using an agent or by acting as an agent itself. The switch or agent may export metadata or data corresponding to observed packets and/or traffic flows to collection and analysis entity 200. In each location in which a sensor is placed, e.g., at a physical network equipment layer (such as a switch), a hypervisor layer, or a virtual machine layer, the sensor observes packets that flow through the respective layer in which it is installed and communicates this information to collection and aggregation entity 200. In some aspects, each sensor is associated with a corresponding IP address, e.g., of a switch, a server, or a virtual machine that it is deployed on, allowing the corresponding IP address to be used as an identifier for the respective sensor. The sensor may also obtain the IP address of the collection and analysis entity 200 along with relevant port information in order to transmit information to the collection and analysis entity as part of a control flow.

As shown in FIG. 2, a typical deployment for virtualized systems involves a plurality of virtual machines running under a hypervisor. Traffic from the virtual machines passes through the hypervisor, and traffic from the hypervisor passes through the network switch. Accordingly, in this type of architecture, traffic flows observed by sensors 62(1A)-62(NA) inside virtual machines 50(1A)-50(NA), respectively, are a subset of the network traffic observed by sensor $S_H$ 64(1) on hypervisor 40(1). Also, the traffic flows observed by sensor $S_H$ 64(1) running on hypervisor 40(1) are a subset of the traffic flows observed by sensor $S_N$ 66 deployed on physical network switch 160.

In a large data center environment, millions of virtual machines may be managed by a plurality of hypervisors running on a plurality of servers. Manually keeping track of where the sensors are located may be onerous. For many applications that analyze captured sensor data, knowing the location of where the sensor is, with respect to the location of other sensors, is important, as well as whether a sensor resides on a virtual machine, a hypervisor, or a switch.

FIG. 3A shows traffic flows that were observed and reported by each of three sensors $S_{VM}$, $S_H$ and $S_N$ in the respective virtual machine, hypervisor and networking hierarchical levels. Each sensor has the capability to export information, e.g., as part of a control flow, to collection and aggregation entity 200. This information may be transmitted to the collection and analysis entity 200 based on the IP address and port address of the collection and analysis entity. Sensors periodically report information about observed traffic flows to collection and analysis entity 200. Information provided by each sensor includes a list of observed traffic flows between the present time and a previous time at which the observed traffic flows were reported to the collection and analysis entity.

As shown in FIG. 3A, traffic flow F1, generated by a virtual machine and observed by a sensor $S_{VM}$, is also observed and reported by sensors $S_H$ and $S_N$ to collection and analysis entity 200. The collection and analysis entity 200 will receive control flow reports for flow F1 from sensors $S_{VM}$, $S_H$, and $S_N$. Traffic flow F2, generated by hypervisor 40 and observed by sensor $S_H$, is also observed and reported by sensor $S_N$ (and not by sensor $S_{VM}$) to collection and analysis entity 200. Accordingly, the collection and analysis entity 200 will receive control flow reports for flow F2 from sensors $S_H$ and $S_N$. Traffic flow F3, generated by the switch, is observed by sensor $S_N$ (and not by sensors $S_{VM}$ and $S_H$), and reported to collection and analysis entity 200. The collection and analysis entity 200 will receive a control flow report for flow F3 from sensor $S_N$. This information is summarized in FIG. 3A, which shows: (1) flow F1 reported by sensors $S_{VM}$, $S_H$, and $S_N$; (2) flow F2 reported by sensors $S_H$ and $S_N$; and (3) flow F3 reported by sensor $S_N$.

Establishing the relationship of different network elements to each other is useful for a variety of applications, including monitoring traffic flow and detecting packet loss, e.g., determining whether a packet originating at a virtual machine was dropped along the network path or associated with a particular flow corresponding to malware. For instance, if a sensor reported flow F1 at $S_{VM}$, but not at $S_N$, and it is known that traffic from sensor $S_{VM}$ should be observed by sensor $S_N$, then it can be determined that packets for flow F1 have been dropped.

FIG. 3A shows a list of sensors and traffic flows that were observed and reported by each sensor. Each sensor reports observed traffic flows to the collection and analysis entity 200, and this information may be aggregated to generate a list, for each flow (e.g., F1, F2 and F3), containing the sensor IDs ($S_D$) of all sensors that report the traffic flow. Each sensor is associated with a unique IP address. For example, referring back to FIG. 2, the IP address associated with sensor $S_{VM}$ 62(1A) may be the IP address of virtual machine 50(1A), e.g., IP1. The IP address associated with sensor $S_H$ 64(1) may be the IP address of hypervisor 40(1), e.g., IP2. The IP address associated with sensor $S_N$ 66 may be the IP address of network switch 160, e.g., IP3. These IP addresses may be used to identify the sensors. The sensor location module 275 of the collection and analysis entity 200 (FIG. 1) may analyze the received traffic flow information, according to the process below, and as summarized in FIG. 3B, to determine the relationship/location of a sensor relative to other sensors.

Continuing with the example, the list (L) of all sensors reporting traffic flow F1 may be represented as F1={$S_{VM}$, $S_H$, $S_N$}, the list of all sensors reporting traffic flow F2 may be represented as F2={$S_H$, $S_N$}, and the list of all sensors reporting traffic flow F3 may be represented as F3={$S_N$}. Sensor IDs are referred to in this example as "VM", "H" or "N".

For every sensor ID ($S_I$) in list L, a tuple is calculated. A tuple represents, for each sensor ID ($S_I$), the set of all sensors in the list L except for $S_I$. From a notation standpoint, this may be represented as {$S_I$, (Set of all sensors in L except $S_I$)}. As shown in FIG. 3B, for flow F1, the generated tuples are $\{S_{VM}, (S_H, S_N)\}$, $\{S_H, (S_{VM}, S_N)\}$, and $\{S_N, (S_{VM}, S_H)\}$. For flow F2, the generated tuples are $\{S_H, (S_N)\}$, and $\{S_N, (S_H)\}$. For flow F3, the generated tuples are $\{S_N, (\ )\}$.

The generated tuples are grouped according to element $S_I$, with $S_I$ being the first element and the remaining sensors being the second element. As shown in FIG. 3B, for $S_{VM}$, there is a single tuple: $\{S_{VM}, (S_H, S_N)\}$. For $S_H$, there are multiple tuples: $\{S_H, (S_{VM}, S_N)\}$ and $\{S_H, (S_N)\}$. For $S_N$, there are also multiple tuples: $\{S_N, (S_{VM}, S_H)\}$, $(S_H)1$ and $\{S_N, (\ )\}$.

For each sensor $S_I$, the intersection of the second elements of the tuples is computed, to determine the 'Front Sensors'. The Front Sensors represent a list of the sensors that detect all flows originating from a sensor $S_I$. For $S_{VM}$, there is one tuple, and therefore, the intersection will simply be the tuple itself $(S_H, S_N)$. For $S_H$, there are two tuples, $(S_{VM}, S_N)$ and $(S_N)$, and therefore, the intersection of the second elements $(S_{VM}, S_N) \cap (S_N)$ will be $(S_N)$. For $S_N$, the intersection of the three tuples is the null set. Accordingly, the Front Sensors for $S_{VM}$ are $S_H$ and $S_N$, and the Front Sensors for $S_H$ are $S_N$. Thus, flows originating from $S_{VM}$ are detected by $S_H$ and $S_N$, and flows originating from $S_H$ are detected by $S_N$.

To determine the 'Rear Sensors', a difference set is computed. The Rear Sensors represent a list of the sensors from which flows originate. The difference set is the difference between the union set and the intersection set of the second elements. As shown in FIG. 3B, the union set for $S_{VM}$ is $(S_H, S_N)$, for $S_H$, the union set is $(S_{VM}, S_N)$, and for $S_N$, the union set is $(S_{VM}, S_H)$. Intersections were computed as described previously with regard to Front Sensors.

Accordingly, the difference set for $S_{VM}$ is $(S_H, S_N)-(S_H, S_N)=\{\ \}$, the difference set for $S_H$ is $(S_N) (S_{VM}, S_N) S_{VM}$, and the difference set for $S_N$ is $\{\ \}-(S_{VM}, S_H)=(S_{VM}, S_H)\}$. Accordingly, the Rear Sensors for $S_{VM}$ are the empty set, the Rear Sensors for $S_H$ are $S_{VM}$, and the Rear Sensors for $S_N$ are $S_{VM}$ and $S_H$. Thus, $S_{VM}$ has no rear sensors, $S_{VM}$ is a rear sensor to $S_H$, and $S_H$ is a rear sensor to $S_N$.

Based on the determination of the Rear Sensors and the Front Sensors, the relationship of the sensors may be established. In this example, the sensors are arranged such that traffic flows from $S_{VM}$ to $S_H$ and then to $S_N$. For a sensor hierarchy including three levels, it may also be determined that sensor $S_{VM}$ is deployed in a virtual machine, sensor $S_H$ is deployed in a hypervisor, and sensor $S_N$ is deployed in a switch, as shown in FIG. 2.

This analysis may be extended to more than three levels of sensors. As another example, four sensors may report traffic flows, as shown in FIG. 4A. For each flow, a list (L) is obtained containing the sensor IDs ($S_{ID}$) of all sensors that report the traffic flow. For example, the list of all sensors reporting traffic flow F1 may be represented as F1=$\{S_1, S_2, S_3, S_4\}$, the list of all sensors reporting traffic flow F2 may be represented as F2=$\{S_2, S_3, S_4\}$, the list of all sensors reporting traffic flow F3 may be represented as F3=$\{S_3, S_4\}$, and the list of all sensors reporting traffic flow F4 may be represented as F4=$\{S_4\}$. FIG. 4B shows a summary of generated tuples for each sensor as well as a summary of intersections, unions and difference sets for the second elements of each group of tuples corresponding to a particular sensor. The analysis is similar to the example provided in FIGS. 3A and 3B, and is not repeated in detail here.

Based upon this analysis, the relationship of the various sensors with respect to one another may be determined. In this case, the sensors are arranged such that traffic flows from $S_1$ to $S_2$ to $S_3$ to $S_4$.

In still another embodiment, traffic flows may be reported by each sensor running on a virtual machine of a plurality of virtual machines. For example, referring back to FIG. 2, sensor $S_{VM}$ 62(1A) may be running on virtual machine 50(1A) and sensor $S_{VM}$ 62(2A) may be running on virtual machine 50(2A). Also, sensor $S_H$ 64(1) may be running on hypervisor 40(1) and sensor $S_H$ 66 may be running on network switch 160.

The techniques presented herein may be used to determine the relationship between, $S_{VM}$ 62(1A), $S_{VM}$ 62(2A), $S_H$ 64(1) and $S_N$ 66. Assuming that the list of all sensors reporting traffic flow F1 may be represented as F1=$\{S_{VM}$ 62(1A), $S_H$ 64(1), $S_N$ 66$\}$, the list of all sensors reporting traffic flow F5 may be represented as F5=$\{S_{VM}$ 62(2A), $S_H$ 64(1), $S_N$ 66$\}$, the list of all sensors reporting traffic flow F2 may be represented as F2=$\{S_H$ 64(1), $S_N$ 66$\}$, and the list of all sensors reporting traffic flow F3 may be represented as F3=$\{S_N$ 66$\}$, the relationship between the sensors may be determined by performing the analysis provided herein. Thus, it may be determined that traffic flowing from sensor $S_{VM1}$ 62(1A) flows through sensor $S_H$ 64(1), and that traffic flowing from sensor $S_H$ 64(1) flows through sensor $S_N$ 66. Similarly, it may be determined that traffic flowing from sensor $S_{VM2}$ 62(2A) flows through sensor $S_H$ 64(1), and that traffic flowing from $S_H$ 64(1) again flows through sensor $S_N$ 66.

Accordingly, the present techniques are not intended to be limited to the particular hierarchical network architectures presented herein. The collection and aggregation entity 200 or any process that analyzes the traffic flow data and/or metadata exported by the sensors can be used to determine the position of a sensor relative to other sensors in a wide variety of architectures.

Figure 5:
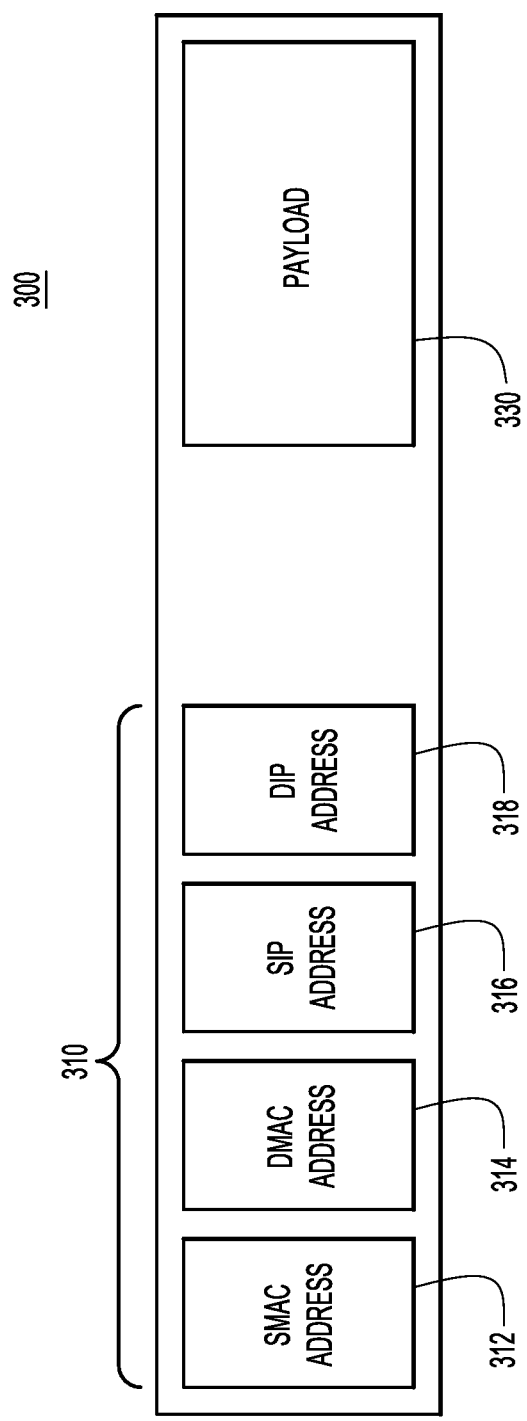
FIG. 5 is a block diagram of components of a packet, according to an example embodiment.

FIG. 5 illustrates components of a packet 300 that may be detected by a sensor as part of a traffic flow. In general, packet 300 may contain a header 310 and a payload 330. Header 310 comprises information related to routing the packet as well as characteristics of the packet itself. Payload 330 generally comprises data. It is understood that header 310 may contain additional components (not shown) utilized for control and data integrity purposes, e.g., components utilized for routing, components utilized for error checking, etc. The components shown in FIG. 5 are not intended to be limiting with regard to the types of components that may be included in a packet.

In particular, header 310 may comprise Source Media Access Control (SMAC) address 312 and Destination Media Access Control (DMAC) address 314. SMAC address 312 provides the address from which the packet has been sent. DMAC address 314 includes the address to which the packet is being sent. Header 310 may also comprise Source Internet Protocol (SIP) address 316 and Destination Internet Protocol (DIP) address 318. SIP address 316 provides the address from which the packet has been sent, and may be used for identification of the sensor. DIP address 318 includes the address to which the packet is being sent. The collector may utilize the SIP address as a sensor identifier, during determination of sensor position.

Figure 6:
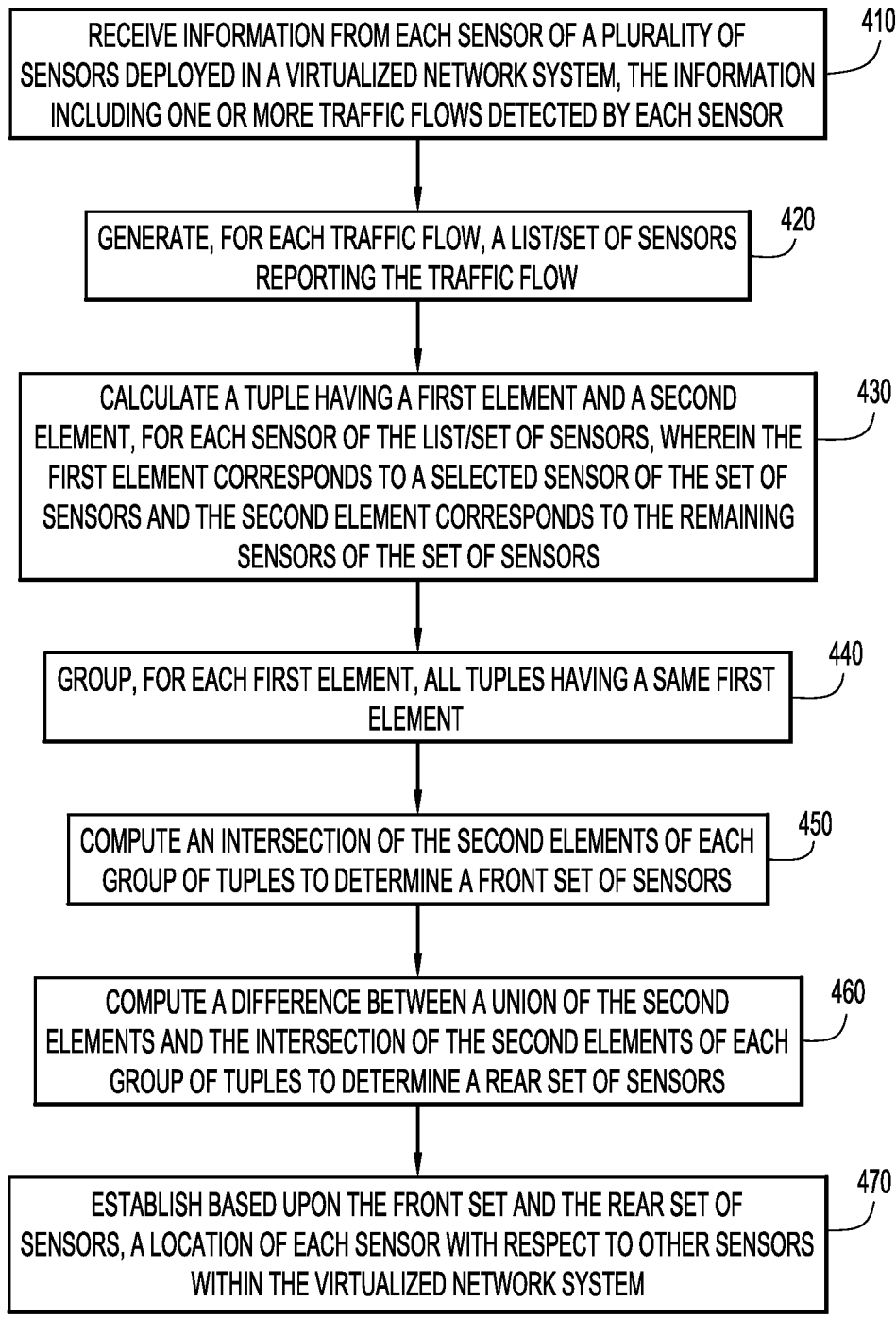
FIG. 6 shows a flow chart for determining sensor location, according to an example embodiment.

FIG. 6 shows an example of a flow diagram describing a process based on the examples described above in connection with FIGS. 3A, 3B, 4A and 4B, according to the techniques presented herein. At operation 410, information from each sensor of a plurality of sensors deployed in a virtualized network system is received, the information including one or more traffic flows detected by each sensor. At operation 420, for each traffic flow, a list/set of sensors reporting the traffic flow is generated. At operation 430, a tuple having a first element and a second element is calculated, for each sensor of the list/set of sensors, wherein the first element corresponds to a selected sensor of the set of sensors and the second element corresponds to the remaining sensors of the set of sensors. At operation 440, all tuples having a same first element are grouped together. At operation 450, an intersection of the second elements of each group of tuples is computed to determine a front set of sensors. At operation 460, a difference between a union of the second elements and the intersection of the second elements of each group of tuples is computed to determine a rear set of sensors. At operation 470, for each respective sensor and based upon the front set and the rear set of sensors, the relationship of each sensor with respect to other sensors within the virtualized network system is established.

Figure 7:
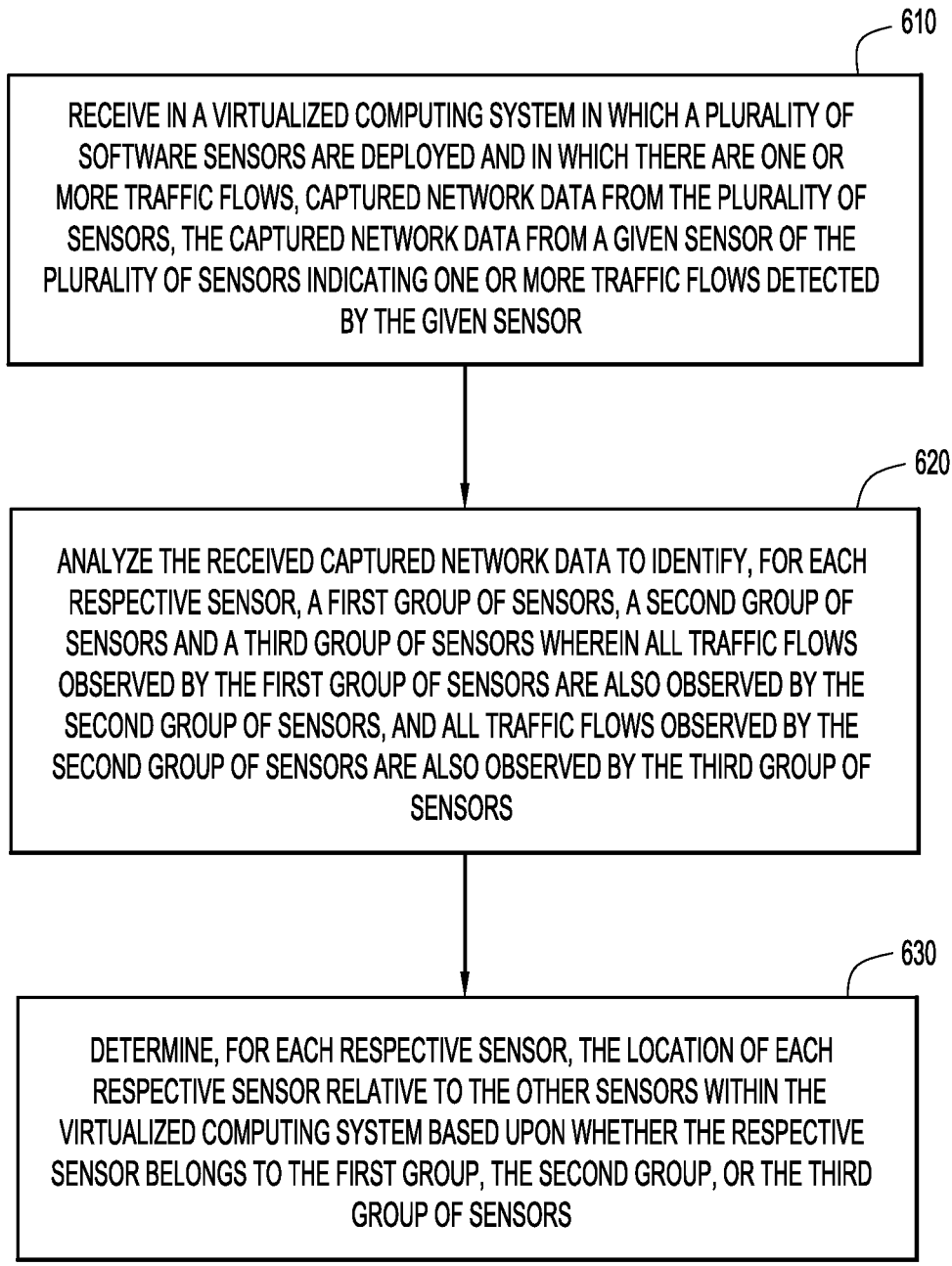
FIG. 7 illustrates another flow chart, similar to FIG. 6, for determining sensor location, according to an example embodiment.

FIG. 7 shows a high-level flow chart that more generally depicts the operations performed according to the techniques presented herein. At operation 610, in a virtualized computing system in which a plurality of software sensors are deployed and in which there are one or more traffic flows, captured network data is received from the plurality of sensors, the captured network data from a given sensor of the plurality of sensors indicating one or more traffic flows detected by the given sensor. At operation 620, the received captured network data is analyzed to identify, for each respective sensor, a first group of sensors, a second group of sensors, and a third group of sensors, wherein all traffic flows observed by the first group of sensors are also observed by the second group of sensors, and all traffic flows observed by the second group of sensors are also observed by the third group of sensors. At operation 630, for each respective sensor, the location of each respective sensor relative to the other sensors within the virtualized computing system is determined based upon whether the respective sensor belongs to the first group, the second group, or the third group of sensors.

Advantages of the present techniques include determining sensor location automatically from analyzing captured network data with zero additional configuration of the system. Sensor location and topology in a cloud/data center environment may be dynamically determined based upon the information provided as part of control flows from each deployed sensor. Network hardware placement changes can be tracked automatically, and there is no need to manually update sensor location information with configuration files.

These techniques are applicable to any type of computing environment, including computing devices such as virtual machines and hypervisors, containers and container manager bare metal compute devices, etc., and are applicable to a variety of network architectures, including leaf-spine, traditional access-aggregation-core tree topologies, etc.

Additionally, the techniques presented herein are not dependent upon a particular hypervisor environment or specific management solution. Rather, these techniques are platform independent, and thus, provide for detecting and updating the location of a sensor (relative to other sensors or with respect to a physical location) automatically. Thus, there is no need to interface with hypervisor management software in order to detect that new virtual machines have been instantiated, that existing virtual machines have been migrated, or that existing virtual machines have been removed.

Accordingly, the techniques presented herein allow determining for sensor location, e.g., whether the sensor is on a virtual machine, a hypervisor, or a networking switch even in a dynamic cloud/data center environment with potentially millions of sensors, to be determined as frequently as control flows are sent to a collection and analysis entity. Also, present techniques provide for determining relative location of sensors with respect to other sensors. These techniques are not limited to the specific examples recited herein, but may be applied to any system in which reporting elements are deployed throughout the system.

In summary, in one form, a method is provided comprising receiving, in a virtualized computing system in which a plurality of software sensors are deployed and in which there are one or more traffic flows, captured network data from the plurality of sensors, the captured network data from a given sensor of the plurality of sensors indicating one or more traffic flows detected by the given sensor; analyzing the received captured network data to identify, for each respective sensor, a first group of sensors, a second group of sensors, and a third group of sensors, wherein all traffic flows observed by the first group of sensors are also observed by the second group of sensors, and all traffic flows observed by the second group of sensors are also observed by the third group of sensors; and determining, for each respective sensor, a location of each respective sensor relative to other sensors within the virtualized computing system based upon whether the respective sensor belongs to the first group of sensors, the second group of sensors, or the third group of sensors.

In another form, an apparatus is provided comprising: a network interface unit configured to enable network communications, a memory, and a processor configured to: receive, in a virtualized computing system in which a plurality of software sensors are deployed and in which there are one or more traffic flows, captured network data from the plurality of sensors, the captured network data from a given sensor of the plurality of sensors indicating one or more traffic flows detected by the given sensor; analyze the received captured network data to identify, for each respective sensor, a first group of sensors, a second group of sensors, and a third group of sensors, wherein all traffic flows observed by the first group of sensors are also observed by the second group of sensors, and all traffic flows observed by the second group of sensors are also observed by the third group of sensors; and determine, for each respective sensor, a location of each respective sensor relative to other sensors within the virtualized computing system based upon whether the respective sensor belongs to the first group of sensors, the second group of sensors, or the third group of sensors.

In yet another form, a non-transitory computer readable storage media is provided that stores instructions that, when executed by a processor of a network or computing device, cause the processor to: receive, in a virtualized computing system in which a plurality of software sensors are deployed and in which there are one or more traffic flows, captured network data from the plurality of sensors, the captured network data from a given sensor of the plurality of sensors indicating one or more traffic flows detected by the given sensor; analyze the received captured network data to identify, for each respective sensor, a first group of sensors, a second group of sensors, and a third group of sensors, wherein all traffic flows observed by the first group of sensors are also observed by the second group of sensors, and all traffic flows observed by the second group of sensors are also observed by the third group of sensors; and determine, for each respective sensor, a location of each respective sensor relative to other sensors within the virtualized computing system based upon whether the respective sensor belongs to the first group of sensors, the second group of sensors, or the third group of sensors.

Described above are examples. The concepts described herein may be embodied in other specific forms without departing from the spirit or essential characteristics thereof. The foregoing examples are therefore to be considered in all respects illustrative and not meant to be limiting. Accordingly, it is intended to embrace all such alterations, modifications and variations that fall within the spirit and scope of any claims filed in applications claiming priority hereto interpreted in accordance with the breadth to which they are fairly, legally and equitably entitled.

What is claimed is:

1. A computer-implemented method comprising:
in a virtualized computing system in which a plurality of software sensors are deployed and in which there are one or more traffic flows, receiving captured network data from the plurality of sensors, the captured network data from a given sensor of the plurality of sensors including a sensor identity of the given sensor and flow identifiers indicating one or more traffic flows detected by the given sensor;
analyzing the received captured network data to identify a first group of sensors, a second group of sensors, and a third group of sensors, wherein all traffic flows observed by the first group of sensors are also observed by the second group of sensors, but only a subset of traffic flows observed by the second group of sensors are also observed by the first group of sensors, and wherein all traffic flows observed by the second group of sensors are also observed by the third group of sensors, but only a subset of the traffic flows observed by the third group of sensors are also observed by the second group of sensors; and
determining, for each respective sensor, a location of the respective sensor relative to one or more other sensors within the virtualized computing system based upon which group of sensors, among the first group of sensors, the second group of sensors, or the third group of sensors, the respective sensor belongs,
wherein if the respective sensor belongs to the first group of sensors, determining that the respective sensor is within a virtual machine,
wherein if the respective sensor belongs to the second group of sensors, determining that the respective sensor is within a hypervisor, and
wherein if the respective sensor belongs to the third group of sensors, determining that the respective sensor is within a network device.

2. The method of claim 1, wherein the received captured network data for the given sensor includes an Internet Protocol address or a Media Access Control address for the given sensor within the virtualized computing system.

3. The method of claim 1, further comprising:
migrating a virtual machine from a first host to a second host in the virtualized computing system, wherein the virtual machine includes one of the plurality of sensors; and
determining a location of the virtual machine that has migrated from the first host to the second host in the virtualized computing system, based upon the captured network data from the plurality of sensors.

4. The method of claim 1, further comprising:
determining, for a plurality of virtual machines and a plurality of hypervisors, which sets of virtual machines are managed by which hypervisors, based upon the captured network data.

5. The method of claim 1, further comprising:
for each respective traffic flow of the one or more traffic flows, identifying a set of software sensors that detects the respective traffic flow;
calculating, for each software sensor of the set of software sensors, a tuple having a first element and a second element, wherein the first element corresponds to an individual sensor of the set of software sensors and the second element corresponds to the remaining sensors in the set of software sensors; and
grouping, for each respective sensor, all tuples having the same first element.

6. The method of claim 5, comprising:
for each respective group of tuples, computing an intersection of the second elements of the tuples in the respective group of tuples to determine a first subset of sensors; and
computing a difference between a union of the second elements of the tuples in the respective group of tuples and the intersection of the second elements of the tuples in the respective group of tuples to determine a second subset of sensors.

7. An apparatus comprising:
a network interface unit configured to enable network communications;
a memory; and
a processor coupled to the network interface unit and configured to:
receive, in a virtualized computing system in which a plurality of software sensors are deployed and in which there are one or more traffic flows, captured network data from the plurality of sensors, the captured network data from a given sensor of the plurality of sensors including a sensor identity of the given sensor and flow identifiers indicating one or more traffic flows detected by the given sensor;
analyze the received captured network data to identify a first group of sensors, a second group of sensors, and a third group of sensors, wherein all traffic flows observed by the first group of sensors are also observed by the second group of sensors, but only a subset of traffic flows observed by the second group of sensors are observed by the first group of sensors, and wherein all traffic flows observed by the second group of sensors are also observed by the third group of sensors, but only a subset of traffic flows observed by the third group of sensors are also observed by the second group of sensors; and
determine, for each respective sensor, a location of the respective sensor relative to one or more other sensors within the virtualized computing system based upon which group of sensors, among the first group of sensors, the second group of sensors, or the third group of sensors, the respective sensor belongs,
wherein if the respective sensor belongs to the first group of sensors, the processor is configured to determine that the respective sensor is within a virtual machine,
wherein if the respective sensor belongs to the second group of sensors, the processor is configured to determine that the respective sensor is within a hypervisor, and
wherein if the respective sensor belongs to the third group of sensors, the processor is configured to determine that the respective sensor is within a network device.

8. The apparatus of claim 7, wherein the received captured network data for the given sensor includes an Internet Protocol address or a Media Access Control address for the given sensor within the virtualized computing system.

9. The apparatus of claim 7, wherein the processor is configured to:

migrate a virtual machine from a first host to a second host in the virtualized computing system, wherein the virtual machine includes one of the plurality of sensors; and determine the location of the migrated virtual machine that has migrated from the first host to the second host in the virtualized computing system, based upon the captured network data from the plurality of sensors.

10. The apparatus of claim 7, wherein the processor is configured to:

determine, for a plurality of virtual machines and a plurality of hypervisors, which sets of virtual machines are managed by which hypervisors, based upon the captured network data.

11. The apparatus of claim 7, wherein the processor is configured to:

identify, for each respective traffic flow of the one or more traffic flows, a set of software sensors that detects the respective traffic flow;

calculate, for each software sensor of the set of software sensors, a tuple having a first element and a second element, wherein the first element corresponds to an individual sensor of the set of software sensors and the second element corresponds to the remaining sensors in the set of software sensors; and group, for each respective sensor, all tuples having the same first element.

12. The apparatus of claim 11, wherein the processor is configured to:

for each respective group of tuples, compute an intersection of the second elements of the tuples in the respective group of tuples to determine a first subset of sensors; and compute a difference between a union of the second elements of the tuples in the respective group of tuples and the intersection of the second elements of the tuples in the respective group of tuples to determine a second subset of sensors.

13. A non-transitory computer readable storage media encoded with instructions that, when executed by a processor of a computing device, cause the processor to:

receive, in a virtualized computing system in which a plurality of software sensors are deployed and in which there are one or more traffic flows, captured network data from the plurality of sensors, the captured network data from a given sensor of the plurality of sensors including a sensor identity of the given sensor and flow identifiers indicating one or more traffic flows detected by the given sensor;

analyze the received captured network data to identify a first group of sensors, a second group of sensors, and a third group of sensors, wherein all traffic flows observed by the first group of sensors are also observed by the second group of sensors, but only a subset of traffic flows observed by the second group of sensors are observed by the first group of sensors, and wherein all traffic flows observed by the second group of sensors are also observed by the third group of sensors, but only a subset of traffic flows observed by the third group of sensors are also observed by the second group of sensors; and determine, for each respective sensor, a location of the respective sensor relative to one or more other sensors within the virtualized computing system based upon which group of sensors, among the first group of sensors, the second group of sensors, or the third group of sensors, the respective sensor belongs, wherein if the respective sensor belongs to the first group of sensors, the instructions cause the processor to determine that the respective sensor is within a virtual machine, wherein if the respective sensor belongs to the second group of sensors, the instructions cause the processor to determine that the respective sensor is within a hypervisor, and wherein if the respective sensor belongs to the third group of sensors, the instructions cause the processor to determine that the respective sensor is within a network device.

14. The non-transitory computer readable storage media of claim 13, wherein the processor is configured to:

migrate a virtual machine from a first host to a second host in the virtualized computing system, wherein the virtual machine includes one of the plurality of sensors; and determine the location of the migrated virtual machine that has migrated from the first host to the second host in the virtualized computing system, based upon the captured network data from the plurality of sensors.

15. The non-transitory computer readable storage media of claim 13, wherein the processor is configured to:

determine, for a plurality of virtual machines and a plurality of hypervisors, which sets of virtual machines are managed by which hypervisors, based upon the captured network data.

16. The non-transitory computer readable storage media of claim 13, wherein the processor is configured to:

identify, for each respective traffic flow of the one or more traffic flows, a set of software sensors that detects the respective traffic flow;

calculate, for each software sensor of the set of software sensors, a tuple having a first element and a second element, wherein the first element corresponds to an individual sensor of the set of software sensors and the second element corresponds to the remaining sensors in the set of software sensors; and group, for each respective sensor, all tuples having the same first element.

17. The non-transitory computer readable storage media of claim 16, wherein the processor is configured to:

compute, for each respective group of tuples, an intersection of the second elements of the tuples in the respective group of tuples to determine a first subset of sensors; and compute a difference between a union of the second elements of the tuples in the respective group of tuples and the intersection of the second elements of the tuples in the respective group of tuples to determine a second subset of sensors.

* * * * *